United States Patent
Rickeby et al.

(10) Patent No.: US 9,998,388 B2
(45) Date of Patent: Jun. 12, 2018

(54) CONGESTION CONTROL BITRATE ALGORITHM

(71) Applicant: Sony Interactive Entertainment LLC, San Mateo, CA (US)

(72) Inventors: Christian Rickeby, Trabuco Canyon, CA (US); Kelvin Yong, Irvine, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 86 days.

(21) Appl. No.: 14/174,747

(22) Filed: Feb. 6, 2014

(65) Prior Publication Data
US 2015/0222555 A1 Aug. 6, 2015

(51) Int. Cl.
*H04L 12/801* (2013.01)
*H04L 12/853* (2013.01)
*H04L 12/825* (2013.01)

(52) U.S. Cl.
CPC .......... *H04L 47/34* (2013.01); *H04L 47/2416* (2013.01); *H04L 47/263* (2013.01)

(58) Field of Classification Search
None
See application file for complete search history.

(56) References Cited

U.S. PATENT DOCUMENTS

| 813,608 A | 2/1906 | Wright |
| 7,613,979 B1 | 11/2009 | Marr et al. |
| 7,821,937 B1 * | 10/2010 | Guo ............... H04L 43/0829 370/230.1 |
| 8,185,805 B2 | 5/2012 | Marr et al. |
| 8,514,225 B2 | 8/2013 | Genova |
| 8,880,651 B2 | 11/2014 | Nielsen |
| 2006/0029065 A1 * | 2/2006 | Fellman ............... H04L 1/004 370/389 |

(Continued)

OTHER PUBLICATIONS

International Search Report and Written Opinion for International Application No. PCT/US2015/013351, dated May 21, 2015.

(Continued)

*Primary Examiner* — Christopher Crutchfield
*Assistant Examiner* — Alan Lindenbaum
(74) *Attorney, Agent, or Firm* — JDI Patent; Joshua Isenberg; Robert Pullman

(57) ABSTRACT

The method may include sending, via an unreliable protocol, a stream of data packets to at least one recipient device over a network. The stream of data packets may include source packets and forward error correction (FEC) packets. The method may include, during said sending, receiving one or more feedback reports from the at least one recipient device, each said periodic feedback report characterizing packet loss during a corresponding period of time. The method may also include, during said sending, adjusting a rate at which said data packets are sent in the stream in response to at least one of said feedback reports. Adjusting the rate may include increasing a FEC rate at which the FEC packets are sent while maintaining a source rate at which the source packets are sent in response to a one of the feedback reports which characterizes the packet loss as within an acceptable level.

30 Claims, 4 Drawing Sheets

(56) References Cited

U.S. PATENT DOCUMENTS

2009/0092152 A1\* 4/2009 Rajakarunanayake ............... H04L 1/0009
370/473
2010/0020713 A1 1/2010 Frankkila
2011/0243052 A1\* 10/2011 Alay .................. H04H 60/11
370/312
2015/0222555 A1 8/2015 Rickeby et al.

OTHER PUBLICATIONS

Chinese Office Action for CN Application No. 201510058914.8, dated Jul. 4, 2017.

\* cited by examiner

CONGESTION CONTROL BITRATE ALGORITHM

FIELD

The present disclosure relates to data transport over a network. In particular, aspects of the present disclosure related to systems and methods for congestion control using unreliable transport protocols in a packet switched network.

BACKGROUND

With the increasing prevalence of digital streaming services and various cloud-based computing solutions, the ability to quickly and accurately transfer large amounts of data between remote devices is a critical task. Sending digital data to a destination system through shared resources of a network, such as the internet, a wide area network (WAN), or local area network (LAN), typically involves the arrangement of data into formatted blocks, known as packets, which may have fixed or variable length. Each data packet typically includes a payload, or body, which has the fundamental user data being delivered to the destination, as well as certain supplemental information used for routing and control purposes, which commonly contained at least partially within a header of the data packet. Broadly speaking, the network, sending systems, and receiving systems may use this supplemental information to ensure proper routing and delivery of the payload to the intended destination.

An often unavoidable consequence of transporting data over a packet switched network in this manner is packet loss, which occurs when one or more data packets fail to properly reach their destination. Packet loss can arise due to a variety of factors, including channel congestion, signal degradation, and other reasons. In order to prevent certain network conditions which cause packet loss to occur, while also efficiently using the available bandwidth in a network channel, a variety of congestion control techniques have been developed. Moreover, there are a range of transport protocols which may incorporate tools to handle packet loss, and the particular method used to handle packet loss when it does occur depends on the particular transport protocol used during data transfer. Generally speaking, these transport protocols can be classified under two types, reliable protocols and unreliable protocols, which each present certain tradeoffs, and the particular choice of protocol used in any instance may depend on the nature of the data transfer. Reliable protocols incorporate guarantees that each data packet is delivered to its destination in sequence, retransmitting dropped packets in the event of packet loss. Reliable protocols are often, but not always, connection-oriented protocols and delivery guarantees are typically accomplished by establishing a backchannel from the recipient back to the sender for a particular communication session, which the recipient may use to send some type of acknowledgement receipts to verify that packets were delivered properly. The sender may use these acknowledgments to guide the retransmission process when it is indicated that data packets failed to properly reach their destination. A prevalent and well-known example of a reliable protocol is Transmission Control Protocol (TCP), which is also connection-oriented. Reliable protocols, such as TCP, are well suited to tasks where accurate transfer of data is a chief concern and some amount of delay can be tolerated in the interests of verifying data packets are delivered properly, such as sending text based emails, digital content downloads, and media streaming services in which audio/video can be buffered at the destination system. Unfortunately, the data verification properties and retransmission of data introduces a comparatively large overhead, rendering many reliable protocols undesirable for time-critical applications, including real-time data transfer, such as live audio and/or video streaming, online video gaming, and internet telephony.

Unreliable protocols, by contrast, generally forgo the type of data delivery verifications for particular packets as described above, and are generally characterized by the fact that they do not guarantee that each packet reaches its destination, nor do they ensure that the packets are delivered in the proper sequence. Unreliable protocols are often, but not always, connectionless, and typically do not establish a fixed channel during any particular communication session. Each data packet may instead be routed independently based on the supplemental information contained in each data packet. A prevalent and well-known example of an unreliable protocol is User Datagram Protocol (UDP), which is also connectionless. Since unreliable protocols like UDP have comparatively reduced overhead by forgoing the reliability properties mentioned above, they are better suited for time sensitive applications where minimizing latency is a chief concern, such as the real-time applications mentioned above.

Since unreliable protocols generally forgo retransmission of data packets, a technique known as forward error correction (FEC) is commonly used to handle packet loss when transporting data using an unreliable service. FEC provides the recipient device with the ability to independently reconstruct lost data without the need for the sender to retransmit source packets which fail to be delivered properly. When forward error correction is used, the original source data is typically redundantly coded at the sender side in the form of FEC packets, which are transmitted to the recipient concurrently with the source packets. In the event of a lost source packet, the recipient device may utilize the redundantly coded data contained in the FEC packets to reconstruct the lost data without having to wait for retransmission.

Importantly, network conditions often vary over time, causing the maximum bitrate available to a sender over a network channel to vary based on present load on the channel. When a sender system attempts to send data packets at a bitrate that exceeds the current available bandwidth of the channel, it can cause congested conditions which trigger severe packet loss in response. This might be tolerable in less time-sensitive applications involving reliable data transport such as TCP, since retransmission of the lost data is guaranteed; however, this may be unacceptable in many real-time applications and other applications involving unreliable transport, as the packet loss may be to such an extent that the recipient is unable to reconstruct the loss data, causing undesirable consequences such as dropout of the signal. On the other hand, when the maximum available bitrate instead far exceeds the bitrate offered by the sender, this is also undesirable, as the full transmission capabilities of the network channel are inefficiently utilized, and the quality of the signal at the recipient side may be unnecessarily poor as a result.

Unfortunately, it is a significant challenge to transfer data using an unreliable protocol in a way that efficiently utilizes the available bandwidth of a network channel without causing congested conditions that result in unacceptable packet loss. Traditional congestion control techniques are often only suitable for reliable protocols, such as TCP, which have feedback to the sender built in to the transport layer, but are ineffective for many unreliable protocols, such as UDP, which typically lack the needed feedback unless independently added over the transport layer by the user. Moreover, congestion control or congestion avoidance algorithms designed for TCP or other reliable protocolsare generally not fast real-time streaming applications or and may be unsuitable for many data transfer applications involving unreliable protocols, as the exponential reduction in bitrate in response to congestion may cause the quality of a real-time signal to suffer too much as a result. Moreover, while packet loss resulting from increasing the bitrate to the point of congestion might be tolerable in less time-sensitive applications, which use TCP or other reliable protocols to retransmit the data, it may be unacceptable in many real-time applications due to a resulting inability of the recipient to reconstruct the data.

Accordingly, there is a need in the art for effective congestion control and congestion avoidance techniques which are suitable for use with UDP and other unreliable transport protocols. It is within this context that aspects of the present disclosure arise.

SUMMARY

In accordance with certain implementations of the present disclosure, a method performed by a sender computing system may include sending, via an unreliable protocol, a stream of data packets to at least one recipient device over a network. The stream of data packets may include source packets and forward error correction (FEC) packets. The method may include, during said sending, receiving one or more feedback reports from the at least one recipient device, each said periodic feedback report characterizing packet loss during a corresponding period of time. The method may also include, during said sending, adjusting a rate at which said data packets are sent in the stream in response to at least one of said feedback reports. Adjusting the rate may include increasing a FEC rate at which the FEC packets are sent while maintaining a source rate at which the source packets are sent in response to a one of the feedback reports which characterizes the packet loss as within an acceptable level.

In accordance with certain implementations of the present disclosure, a sender computing system may include at least one processor unit, and at least one memory unit coupled to the at least one processor unit. The at least one processor unit and the at least one memory unit may be configured to perform a method. The method may include sending, via an unreliable protocol, a stream of data packets to at least one recipient device over a network. The stream of data packets may include source packets and forward error correction (FEC) packets. The method may include, during said sending, receiving one or more feedback reports from the at least one recipient device, each said periodic feedback report characterizing packet loss during a corresponding period of time. The method may also include, during said sending, adjusting a rate at which said data packets are sent in the stream in response to at least one of said feedback reports. Adjusting the rate may include increasing a FEC rate at which the FEC packets are sent while maintaining a source rate at which the source packets are sent in response to a one of the feedback reports which characterizes the packet loss as within an acceptable level.

In accordance with certain implementations of the present disclosure, a non-transitory computer readable medium may computer readable instructions embodied therein. The computer readable instructions may be configured to implement a method when executed. The method may include sending, via an unreliable protocol, a stream of data packets to at least one recipient device over a network. The stream of data packets may include source packets and forward error correction (FEC) packets. The method may include, during said sending, receiving one or more feedback reports from the at least one recipient device, each said periodic feedback report characterizing packet loss during a corresponding period of time. The method may also include, during said sending, adjusting a rate at which said data packets are sent in the stream in response to at least one of said feedback reports. Adjusting the rate may include increasing a FEC rate at which the FEC packets are sent while maintaining a source rate at which the source packets are sent in response to a one of the feedback reports which characterizes the packet loss as within an acceptable level.

BRIEF DESCRIPTION OF THE DRAWINGS

The teachings of the present disclosure can be readily understood by considering the following detailed description in conjunction with the accompanying drawings, in which.

DETAILED DESCRIPTION

Although the following detailed description contains many specific details for the purposes of illustration, anyone of ordinary skill in the art will appreciate that many variations and alterations to the following details are within the scope of the invention. Accordingly, the illustrative implementations of the present disclosure described below are set forth without any loss of generality to, and without imposing limitations upon, the claimed invention.
Introduction Aspects of the present disclosure relate to congestion control and/or congestion avoidance techniques which may be used with an unreliable transport protocol, such as UDP.

In accordance with certain aspects, one or more sender devices may send data packets to one or more recipient devices using an unreliable transport protocol, such as UDP. The data packets may include both source packets, containing the desired source data, as well as FEC packets, containing redundancies of the source data for error correction in the event that one or more of the source packets fail to reach the one or more recipient devices. Periodic feedback reports may be sent from the one or more recipient devices to the one or more sender devices. The feedback reports may identify packet loss during the corresponding period of time, and the sender may use the feedback reports to identify whether packet loss occurred during the period of time and/or to identify an extent of packet loss during the corresponding period of time. The packet loss may occur, for example, as a result of the sender offering too high of a bitrate into the data stream.

In accordance with certain aspects, the one or more sender devices may use periodic feedback reports to adjust aspects of a bitrate of data packets in a stream sent to the one or more recipient devices. Aspects of the bitrate may be adjusted in a manner that optimizes the ability of the recipient device to obtain the source data. In certain aspects, in response to a feedback report which indicates that packet loss is within an acceptable level, a bitrate of FEC packets may be increased, while maintaining a concurrent bitrate of source packets in the stream in response to the initial feedback report. In accordance with certain aspects, because the bitrate may be adjusted by increasing only the number of FEC packets used for error correction, the one or more recipient devices may be able to reconstruct the source data even if the increase in bitrate results in congestion and increased packet loss. For example, because the ratio of FEC packets to source packets may be increased, FEC packets are likely to be successfully delivered in sufficient numbers to reconstruct data lost due to loss of source packets during delivery.

Further Details

Figure 1:
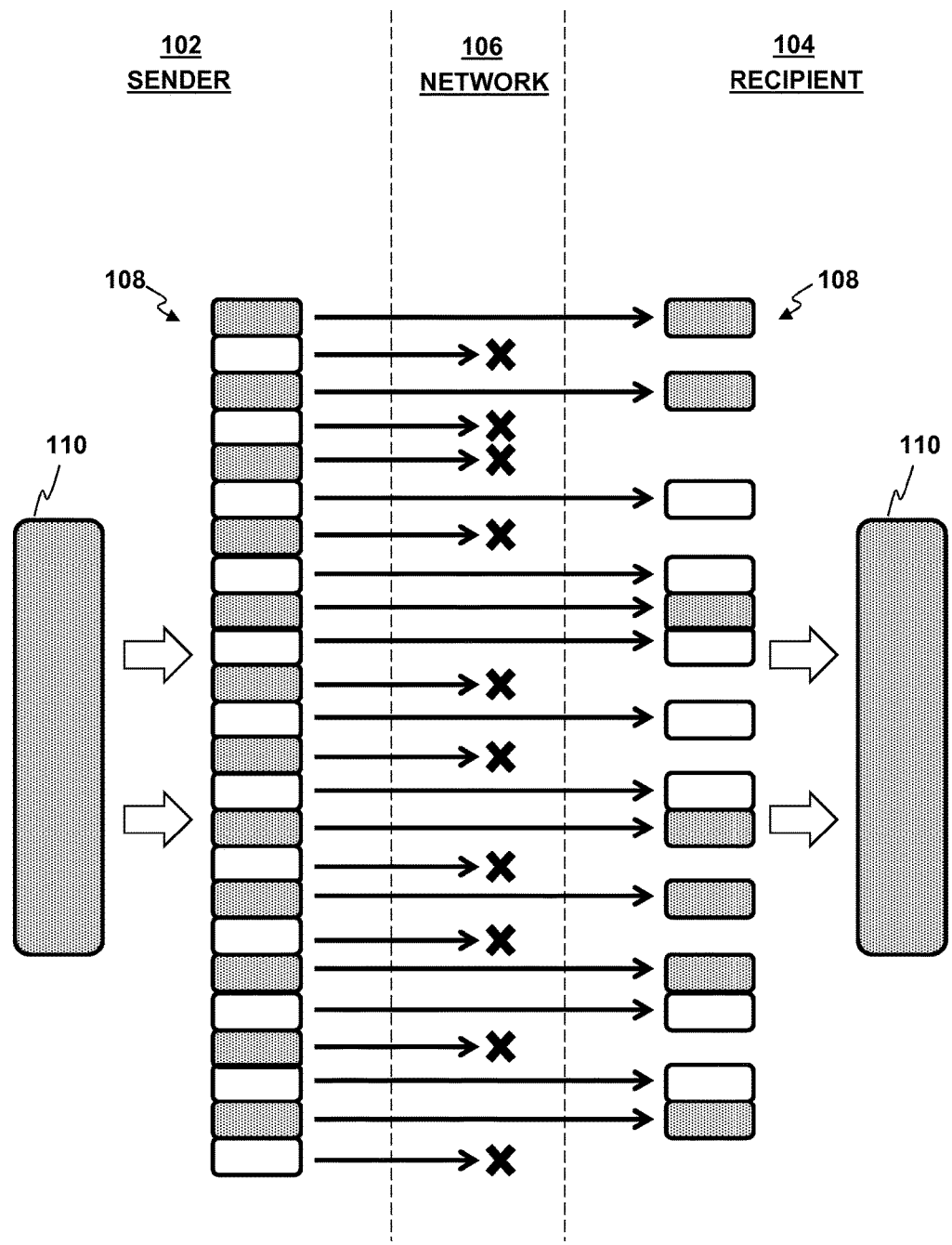
FIG. 1 is a schematic diagram of an example data transport and forward error correction technique in accordance with certain aspects of the present disclosure.

Turning now to FIG. 1, an illustrative example of a data transport and forward error correction (FEC) technique is depicted in accordance with certain aspects of the present disclosure. In the example of FIG. 1, one or more sender devices 102 may send data to one or more recipient devices 104 over a network 106, and the data may be transmitted in the form of a plurality of data packets 108. The data packets 108 may be datagrams sent using an unreliable protocol, such as UDP, in which neither delivery of each packet 108 nor delivery of the packets 108 in order is guaranteed by the protocol. Accordingly, in the event of packet loss, the sender device 102 does not retransmit the lost pockets; rather, the recipient device 104 may attempt to reconstruct the lost source data using redundancies encoded into the data stream by the particular FEC technique used.

As shown in FIG. 1, the data packets 108 may include both source packets (shaded boxes in FIG. 1) which contain the original source data 110 being delivered to the recipient device 104 and FEC packets (white/blank boxes in FIG. 1), which are parity packets containing information that allows it to take the place of any lost source packet as long as there are enough other source or parity packets available. The FEC packets may contain redundancies of the original source data 110 and may be used by the recipient device 104 to reconstruct the source data 110 in the event that one or more of the source packets fail to properly reach the recipient 104, e.g., because they are dropped by the network 106. In certain implementations in which the transmitted data includes an audio and video stream, the data packets 108 may further include both audio packets and video packets of both of the aforementioned types, e.g., the data packets 108 may include audio source packets, audio FEC packets, video source packets, and video FEC packets, and the audio packets may generally be smaller (i.e., contain lesser amounts of data) than the video packets.

In certain implementations, the source data 110 may be a data stream that is transmitted to the recipient device 104 in real-time, and the source data 110 may be generated by an application running on the sender device 102. In such implementations, the real-time source data 110 may be made up a plurality of frames of data output in sequence, and the frames may be defined by an application which generates the source data. For example, the source data 110 may be a real-time audio/video (A/V) stream output from an application running on the sender device 102, such as a video game, video telephony program, or other A/V source program, and the application may define each frame.

In the example of FIG. 1, the illustrated block of source data 110 may correspond to a single frame, e.g., a single A/V frame, for which a plurality of source packets and FEC packets are generated and transmitted over the network 106 to the recipient device 104. The stream of data may be made up of a plurality of frames 110, which may be generated in a sequence at the sender device 102, and the plurality of data packets 108 may be formed for each frame for transmission to the recipient device 104.

It is noted that, when the data is transmitted using UDP or another unreliable protocol, the data packets 108, e.g., datagrams, may be routed by the network 106 through different respective paths and may arrive at the recipient device out of sequence. In order to facilitate reconstruction of the data at the recipient device 104, each of the data packets 108 may be stamped by the sender device with certain identifying information. For example, each data packet 108 may be stamped with a frame identifier, e.g., a frame number, indicating to which frame in the sequence that the data packet belongs, as well as a sequence identifier, e.g., a sequence number, indicating wherein in the sequence within each frame (and/or across frames) the data packet belongs. Accordingly, the sender device 102 may increment the sequence number for each new data packet formed and may increment the frame number of the data packets for each new frame formed. Optionally, the data packets 108 may also be stamped with further identifying info, such as a type identifier that identifies, e.g., whether a packet is an audio or video packet in implementations where the data stream is a real-time data stream having both an audio and a video component. The recipient device 104 may assemble the data in accordance with this supplemental information stamped to each packet, and may decode the data accordingly, e.g., for presentation to an end-user at the recipient side.

In the event of packet loss in which one or more of the source packets are dropped by the network 106 or otherwise fail to reach their destination, the recipient device 104 may utilize the redundantly coded FEC parity packets to reconstruct the source data 110 without retransmission by the sender device 102, as shown in FIG. 1. It is noted that any number of FEC parity packets can be generated from one or more source packets using different algorithms. In certain implementations, the FEC data may be generated using an erasure code. In certain implementations, the erasure code may be a Reed-Solomon code. One non-limiting example, among others, of an open source library which supports erasure coding and which may be used in implementations of the present disclosure is known as Jerasure. In certain implementations, the error correction scheme may be such that, for each source packet that fails to reach the recipient, one FEC packet may be needed to reconstruct the particular set of data. For example, for a particular frame of data that is delivered to the recipient device, the FEC technique may be one in which, in order to fully reconstruct the frame in the event of packet loss, the number of FEC packets which properly reach the recipient device needs to be at least equal to the number of lost source packets. Otherwise, the frame may be corrupted. In other words, if N source packets exist and M parity packets were generated, then source data can be recovered when at least N total packets (source and parity) are received. In the illustration of FIG. 1, the number of source packets sent by the sender is equal to the number of FEC packets sent, i.e., the ratio of source packets to FEC packets transmitted by the sender 102 is simply 1:1, for simplicity of illustration. However, it is noted that many other ratios may be used, and that the ratio of source packets to FEC packets may be dynamic and change over time during a stream in accordance with certain aspects of the present disclosure, as described below.

In order to optimize how efficiently the available bandwidth is utilized during the data transfer, as well as avoid overloading the network channel in a manner that would trigger unacceptable packet loss, the sender device 102 and/or the recipient device 104 may be configured to implement a congestion control algorithm in accordance with aspects of the present disclosure.

Figure 2:
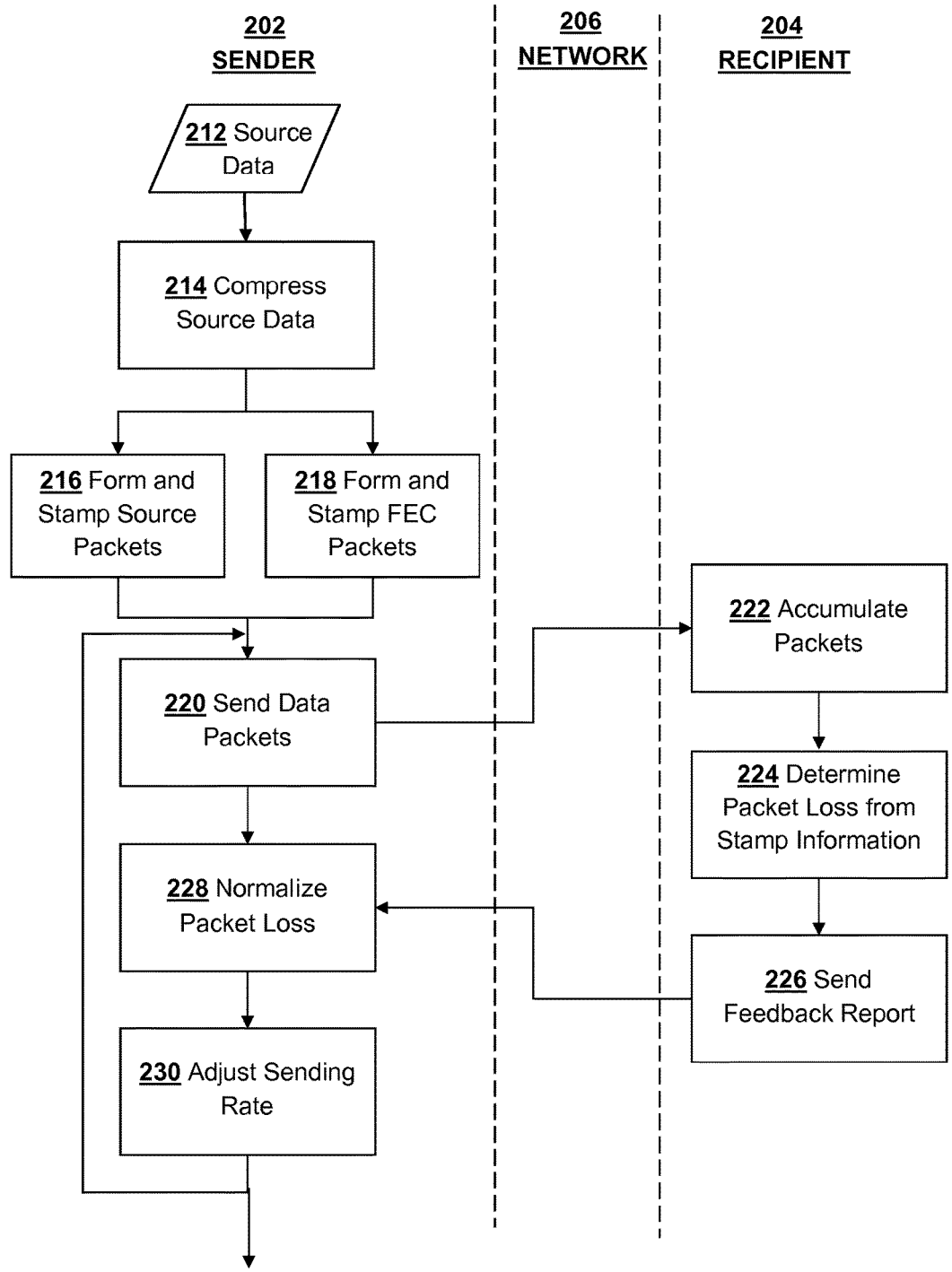
FIG. 2 is flow diagram of an example congestion control technique in accordance with certain aspects of the present disclosure.

Turning now to FIG. 2, a flow diagram of an illustrative example of a congestion control technique between one or more sender devices 202 and one or more recipient devices 204 is depicted. In certain implementations, the congestion control technique may have similarities to at least some aspects of the data transport and error correction technique depicted in FIG. 1.

In accordance with various aspects of the present disclosure, the sender device 202 may be configured to send original source data 212 to at least one recipient device 204 over a network 206. By way of example, and not by way of limitation, the network 206 may be the internet, a WAN, a LAN, or another network which uses packet switching to route data packets to their destination. In certain implementations, the sender device 202 may receive the source data 212 from an application, which may be running on the sender device, and the sender device may be configured to transmit the source data 212 in real-time to the recipient device 204 using an unreliable transport protocol, such as UDP.

In certain implementations, the source data 212 may be of a type that needs to be compressed before transmission over the network, and the sender device may be configured to compress the source data, as indicated at 214. By way of example, and not by way of limitation, the source data may include a real-time audio stream, a real-time video stream, or both (i.e., a real-time audio/video stream), and the sender device may compress the data into any of a variety of compressed formats using an audio and/or video encoder. In certain implementations, the source data may be encoded using a low latency codec. For example, the source data may include a real-time video stream encoded according to the h.264 format, an example of a low latency video codec. By way of further example, the source data may include a real-time audio stream encoded according to the CELT format, and example of a low latency audio codec.

The sender device 202 may then prepare the source data, e.g. as received from an application in compressed or uncompressed form, for transmission by forming a plurality of data packets, as indicated at 216 and 218. Forming the data packets may involve dividing set of source data into a plurality of discrete payloads and adding supplemental data to each payload to form the data packet. The data packets formed by the sender device 202 may include source packets, as indicated at 216, which contain the source data 212 (in compressed format for the illustrated example of FIG. 2), and FEC packets, as indicated at 218, which contain redundancies of the source data 212 and may be formed according to some error correcting code.

According to certain aspects of the present disclosure, the source data 212 may be made up of a plurality of frames, which may be defined by an application running on the sender device 202, and the sender device may form a plurality of data packets, including source packets and FEC packets, for each frame. In certain implementations of the present disclosure, before sending the data packets, the sender device 202 may stamp each of the data packets with certain identifying information for use in the transmission process. In accordance with certain aspects, the stamp information added to each data packet, as indicated at 216 and 218, may include a frame identifier, e.g., a frame number, which indicates to which frame each data packet belongs, and a sequence identifier, e.g., a sequence number that indicates where each data packet belongs within a sequence that extends within and across frames. Accordingly, the sender device may be configured to increment the sequence number with each distinct data packet, and increment the frame number with each distinct frame of data. In certain implementations, such as those in which the source data includes a real-time audio and video stream, the stamp information may also optionally include a media type identifier, which may identify whether the particular data packet contains audio data or video data. The sender device may then send the data packets after they are formed and stamped, as indicated at 220, for deliver to one or more recipient devices 204 over a network 206.

The sequence number may be incremented by a predetermined amount (e.g., by 1) for each new packet. A recipient device 204 may use the sequence numbers of received packets to determine how many packets are missing. The stamp information may also include extra information to determine e.g., how many packets are in a frame and which packet index within the frame a given packet is.

The recipient device 204 may receive those data packets which are properly delivered, e.g., those are not dropped by the network 206, and the recipient device 204 may accumulate the data packets as they arrive, as indicated at 222. The recipient device 204 may use the supplemental information contained with each packet, including, e.g., the frame and sequence identifier information, to assemble the received data accordingly. The recipient device 204 may also reconstruct any lost source packets using the FEC packets, according the particular error correction technique used.

In accordance with certain aspects, the recipient device 204 may be configured to periodically determine packet loss for a given period of time from the stamp information contained with each packet, as indicated at 224. In certain implementations, the recipient device 204 may compare the total number of data packets received during a period of time to the sequence information stamped to the received packets during that period of time in order to determine a rate of packet loss for that particular period. For example, since the sequence identifiers may increment with each new packet, they may be indicative of the total number of data packets which should have been received during a particular period of time if all of the data packets were properly delivered. The recipient device 204 may compare this number of expected packets determined from the sequence identifiers to the number of packets actually received during the period of time in order to figure the packet loss for that period. The recipient device 204 may then send the packet loss to the sender device 202 as feedback information for the particular period of time, as indicated at 226.

It is noted that the transport protocol used to send the feedback information from the recipient device back to the sender device may be the same protocol as the unreliable protocol used for transferring the data packets from the sender to the recipient, or it may be a different protocol. For example, the unreliable protocol used to transfer the data packets from sender to recipient may be a connectionless protocol, such as UDP. In certain implementations, a reliable channel from the recipient device to the sender device may be created over UDP. An example of an open source solution for creating a reliable channel over UDP, and which may be used in certain implementations of the present disclosure is usrsctp. In other implementations, a reliable backchannel for sending feedback reports from the recipient device back to the sender device may be established using a completely separate connection, such as a separate reliable protocol, e.g., TCP or a reliable channel established using some other reliable protocol. In certain implementations, it may be preferable to reliably send the feedback information due to the different nature and purpose of this data, as compared to the source data sent from sender to recipient.

In certain implementations, the sender device 202 may normalize the packet loss in the feedback information received from the recipient device, as indicated at 228. This may be accomplished by normalizing the packet loss to a pre-determined amount of packets, which may correspond to the expected amount of packets sent during a regular streaming period. For example, if the recipient device determines the packet loss as a ratio of received packets to expected packets, as determined from the sequence information, this ratio may tend to overestimate the packet loss if the amount of data packets actually sent was far less than what could have been sent by the sender device. As a more detailed example, if the sender device sends four packets, but the recipient device only receives three packets for a particular period, the recipient device may determine the packet loss to be 25%. However, if the sender device could have sent 100 packets in this period, but only sent four because that was all the data that needed to be sent, the true packet loss may be more accurately expressed as one lost packet out of 100, instead of 1 lost packet out of 4, i.e., 1% instead of 25%. As a more general example, it may be pre-determined that during regular streaming, N packets should be received during a time period X. If during X, the recipient device reports packet loss based on N/2 packets, e.g., based on the sequence numbers of the data packets, then any loss should be normalized by the sender to a number of lost packets out of N, not out of N/2. Accordingly, the sender device may be configured to normalize the packet loss received from the one or more recipient devices 204 to a predetermined amount of the data packets expected to be transported during the period of time.

In accordance with certain aspects, in response to the feedback information received from the recipient device 204 (optionally further normalized at the sender side), the sender device 202 may adjust the rate at which it sends data packets, as indicated at 230, in accordance with certain principles of congestion control described herein. In certain instances, in response to a set of feedback information which indicates that packet loss was within an acceptable level during that corresponding period of time, the sender device may be configured to increase the bitrate of the stream, but it may do so by initially only increasing the bitrate at which FEC packets are sent while maintaining or otherwise not increasing the bitrate at which source packets are sent. Further aspects regarding how the bitrate may be adjusted in response to the feedback information are described elsewhere in this disclosure.

It is important to note that the example method depicted in FIG. 2 may be a continuous or repeated process, and may continue for so long as the source data 212 is being transmitted. In certain implementations, the feedback information may be sent by the recipient 204 device to the sender device 202 periodically during the data transmission so that the sender device 202 may periodically adjust the bitrate at which the data packets are sent in direct response to the feedback information. It is noted that sending the feedback information more frequently may increase the responsiveness of the stream, but at the tradeoff of reducing the upstream bandwidth (i.e. from recipient to sender) to account for the feedback information. In certain implementations, the feedback reports may be sent 5 times a second, i.e., every 200 milliseconds (ms). In further implementations, the feedback reports may be sent in the range of every 100 ms and every 1 second. If the feedback is sent too frequently, e.g., more than once every 100 ms, then the recipient may not have had enough time to accumulate a useful number of packets to determine packet loss, and it may be too small of a sample size. By contrast, if it is not sent often enough, e.g., less than once every second, then it may not be often enough to be useful.

It is noted that, in certain implementations, the sender device may send the data packets to a plurality of recipient devices, and may adjust the bitrate in response to feedback reports from a plurality of difference destination systems. In certain implementations, this may be accomplished by way of a respective encoder on the sender device for each respective recipient device, in which case the sender device may be configured to independently adjust the bitrate for respective recipient devices based on their respective feedback information. In other implementations, the sender device may include one encoder that serves a plurality of the recipient devices, in which case the bitrate may be adjusted for all of the recipient devices based on the lowest quality transport.

Figure 3:
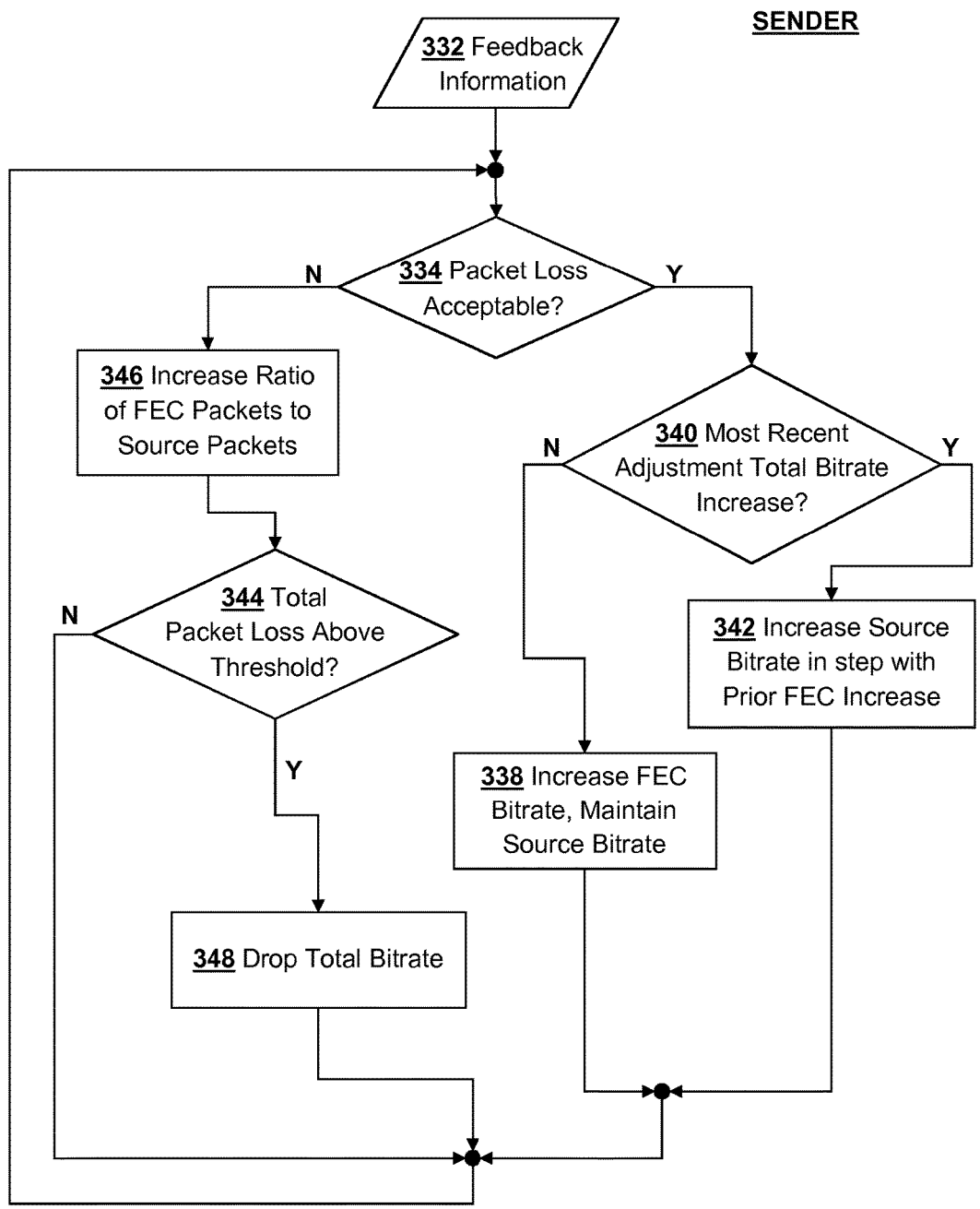
FIG. 3 is a flow diagram of a detailed example of adjusting a bitrate rate with a sender device in response to feedback from at least one recipient device according to certain aspects of the present disclosure.

It is noted that the manner in which the bitrate is adjusted by the sender device in response to the feedback information received from the recipient device may depend on the nature of packet loss for any particular feedback report. Certain illustrative aspects of how a bitrate might be adjusted in response to feedback according to certain aspects of the present disclosure are depicted in FIG. 3. In particular, FIG. 3 depicts an example process flow for adjusting a bitrate at which data is transferred over an unreliable protocol in response to feedback information, in accordance with certain implementations of the present disclosure. It is noted that the example method 330 of adjusting the bitrate depicted in FIG. 3 may have one or more aspects in common with the adjustment of the bitrate indicated at 230 in FIG. 2. It is also important to note that the example of FIG. 3 is only a simplified example for purposes illustrating only certain aspects of how a rate may be adjusted in accordance with the present disclosure.

At the outset, it is important to note that the total bitrate of the stream, defined by the rate at which all data packets are sent by the sender, includes both a source bitrate, defined by the rate at which source packets are sent, and a FEC bitrate, defined by the rate at which FEC packets are sent. As shown in FIG. 3, how the bitrate is adjusted in response to feedback information 332 that is received by the sender from one or more recipient devices may generally depend on whether or not the feedback information 332 indicates that packet loss was within an acceptable level during the respective period of time, as indicated at 334. It is noted that the acceptable level indicated at 334 may defined relative to prior conditions. For example, the indicated packet loss may be within an acceptable level if it is steady with respect to prior conditions, e.g., the level of packet loss is relatively constant and has not fluctuated with respect to the packet loss indicated in a prior feedback report. How the bitrate is adjusted may also depend on whether feedback information indicates packet loss above some predetermined total packet loss threshold, as indicated at 344.

In accordance with certain aspects, where a particular feedback report 332 from the recipient device indicates that the packet loss was within an acceptable level during that respective period, this may indicate that the total bitrate transmitted by the sender may be increased, e.g., because the maximum available bandwidth of the network channel is not being filled up by the transmitted stream. In certain implementations, the indicated packet loss may be within an acceptable level when it is the same or within an acceptable amount of change relative to an immediately prior feedback report. Thus, in certain implementations, as long as the loss is not fluctuating, the packet loss may be increased. However, blindly increasing the bitrate, even incrementally, may trigger packet loss, which may ordinarily cause unacceptable consequences such as corruption of frames or dropout of the signal at the recipient device.

Accordingly, certain implementations of the present disclosure may address these challenges by increasing the bitrate by initially only increasing the FEC bitrate while maintaining the source bitrate, as indicated at 338, in response to a feedback report indicating that packet loss did not increase or was otherwise within some acceptable level such as when it is indicated as steady. Importantly, because the result would be a greater number of FEC packets, even if the increase in bitrate causes packet loss, e.g., due to channel congestion, the recipient device will be able to, or at least very likely be able to, reconstruct any lost source packets due to the resulting greater amount of FEC packets in the stream. For example, it will be much more likely that the number of FEC packets properly delivered is greater than, or at least equivalent to, the number of source packets lost during transfer. Moreover, such an increase in the rate of data transfer may provide the needed feedback to the sender device, because the subsequent feedback report 332 received by the sender device would reflect the greater total bitrate in the stream, and indicate whether that increase in total bitrate caused packet loss to fluctuate, e.g., due to channel congestion.

If packet loss continues to be steady in response to the increased bitrate, e.g., it does not fluctuate or increase in response to the offered data packets as indicated by one or more subsequent feedback reports 332, the next adjustment to the bitrate may be an increase in the source bitrate in step to the prior increase in FEC bitrate, e.g., by the same amount as the prior FEC increase, as indicated at 342. In certain implementations, this may be in response to the immediately subsequent feedback report, or it may be after some other time interval having more than one feedback report, so long as the packet loss stayed acceptable throughout the interval, as indicated by the feedback 332. In other words, as indicated at 340, if the most recent change was an increase to the FEC bitrate while maintaining the source bitrate, this next adjustment, if packet loss continues to be acceptable, may be an increase in the source bitrate by the same amount as the prior FEC increase. This total bitrate may then continue to be increased incrementally as long as the feedback 332 indicates that packet loss is steady.

By way of example, and not by way of limitation, if the most recent adjustment, as indicated at 340, was not an increase in the total bitrate, then the available bandwidth of the stream may be tested by increasing the FEC bitrate by 100 kb/s, as indicated at 338. If the one or more subsequent feedback reports indicate that there is no packet loss, as indicated at 334, then the next adjustment may be an increase in the source bitrate by 100 kb/s, as indicated at 342, and the FEC bitrate may be maintained when the source bitrate is increased in this manner, resulting in another increase in the total bitrate. The total bitrate may continue to be increased in this manner until packet loss fluctuates in response to the increase bitrate. Leading with the FEC packets to ensure that the recipient device will be able reconstruct lost source data in the event of packet loss triggered by the initial increase in total bitrate. Moreover, the leading increase in FEC packets may generate the desired feedback to determine whether the source bitrate can be increased.

By way of example, and not by way of limitation, say the total bitrate of the stream is 2000 kb/s, and 100 kb/s of that is FEC packets making 1900 kb/s of source packets. To test the bandwidth, initially the FEC rate may be increased to 200 kb/s. Now total bandwidth is 2100 kb/s. When it is determined that there is no additional loss, the source rate may be increase by the amount of the prior FEC rate increase. Source rate then becomes 1900 kb/s+100 kb/s=2000 kb/s, with the total rate being (2000 kb/s source)+(100 kb/s of FEC)=2100 kb/s total, but bandwidth could immediately tested by again making FEC 200 kb/s. Thus there is 2000 kb/s source+200 kb/s FEC. The next iteration may be 2100 kb/s source+200 kb/s FEC on the next iteration, followed by 2200 kb/s source+200 kb/s FEC and so on until packet loss is increased in response to the offered data.

In accordance with certain aspects, it is noted that the manner in which the bitrate is increased, e.g., the FEC bitrate is increased at 338, may depend on various considerations. For example, the amount by which it is increased may vary as desired. Moreover, in implementations have distinct types of source data, resulting in distinct types of source and FEC packets, the manner in which the increase in bitrate is distributed may vary according to the nature of these packets, e.g., based on the relative size of each distinct type of packet.

For example, in certain implementations involving real-time transmission of an audio/video stream, the total bitrate may also be defined by an audio bitrate, defined by the rate at which audio packets are sent, and video bitrate, defined by a rate at which video packets are sent. In these implementations, the total bitrate may be include at least four distinct types of bitrates, an audio source bitrate, a video source bitrate, an audio FEC bitrate, and an audio source bitrate. Because each video packet may generally be much larger than each audio packet, increasing the bitrate by only increasing the rate for video FEC packets might cause too large an increase for even a relatively low number of packets, resulting in too much congestion triggered by the increase. Accordingly, in such implementations, each increase in bitrate, e.g., as indicated at 338, may include an increase in both the number of video FEC packets per frame and the number of audio FEC packets per frame. Importantly, the ratio at which the bitrate for these two distinct types of packets are increased may be tuned according to their relative sizes as desired, e.g., in order to account for the fact that audio packets are smaller and thus facilitate finer adjustments to the total bandwidth. By way of example, and not by way of limitation, the ratio of increased audio FEC bitrate to increased video FEC bitrate with each iteration may be in the range of 2:1 to 10:1. In other words, increasing the FEC bitrate at 338 or increasing the source bitrate at 342 may include sending from two to ten additional audio packets for every one additional video packet per frame.

In accordance with further aspects of the present disclosure, when a feedback report instead indicates that packet loss is no longer acceptable, e.g., because has fluctuated or increased with respect to prior conditions, as indicated at 334, the bitrate of the stream may be adjusted in a different fashion than when the packet loss was acceptable. In certain implementations, an initial adjustment, in response to a feedback report indicating packet loss was present, may involve increasing the ratio of FEC packets to source packets, while maintaining the total bitrate, as indicated at 346. Because this illustrative initial step does not involve a reduction in the total bitrate sent by the sender device, only a change in the ratio of FEC packets to source packets, this may not reduce packet loss if such loss is due to congestion in the channel. However, because of the greater number of FEC packets in the stream, the recipient device may be better equipped to handle the packet loss. Moreover, this allows the sender to continue to get additional feedback before reducing the total bitrate, in case the conditions causing the packet loss were transient.

If packet loss continues to be a problem and it is beyond some total predefined threshold, as indicated at 344, then the bitrate may be adjusted by dropping the total bitrate, as indicated at 348. The total bitrate may be dropped by some pre-defined amount, or it may be dropped to whatever bitrate most recently worked, e.g., the bitrate which resulted in feedback 332 that indicated packet loss was acceptable.

It is noted that, in some instances, the amount of source data available for the sender to transmit over the network may be insufficient to fill the amount of bandwidth currently available. By way of example, and not by way of limitation, if a real-time video is currently producing a black screen, the bitrate of the source data may be low because the application is simply not producing enough data to fill the available bitrate. However, it may still be desirable for the congestion control algorithm to continue to acquire feedback regarding the maximum available bitrate in the stream so that an efficient amount of the available bandwidth is available when needed. In these instances, the system may be configured to not only add to the total bitrate to test the next step in the bandwidth, as described above, but also fill in remaining available bandwidth not used for source data with FEC packets.

This may be illustrated by the following example. Say the process is currently transmitting data packets at 6 MB/s, and the feedback from the recipient device still indicates that packet loss is within an acceptable range so that the transmitted bandwidth can be increased. The next step may be to increase the FEC bitrate by another 100 kb/s so that the total bandwidth is at 6.1 MB/s. However, the source data may only be being produced at 1 MB/s, e.g., because an application is currently producing a video that is a black screen. In such an instance, the process may be configured to fill in the remainder of the bandwidth being tested with FEC packets by transmitting FEC packets at a bitrate of 5.1 MB/s. Accordingly, when the bitrate of source data that is currently being produced increases again, e.g., because the video changes from a black screen to live pictures again, the system may still efficiently utilize maximum available bitrate because the algorithm continued to acquire feedback and incrementally increase the transmitted bandwidth, even though the source bitrate momentarily dropped off.

It is emphasized that the example technique depicted in FIG. 3 is provided for purposes of illustration only, in order to highlight certain aspects of the present disclosure. In practice, implementations of the present disclosure may factor in additional or alternative considerations not depicted by the example of FIG. 3, and may be more complex than the simplified scheme depicted in FIG. 3.

It will be appreciated from example of FIG. 3 that certain aspects of the present disclosure include increasing the ratio of FEC packets to source packets in response to a feedback report from at least one recipient device. This may be by way of increasing the amount of FEC packets while maintaining the amount of source packets in order to increase the total bitrate, e.g., as indicated at 338, in response to feedback indicating that packets loss was acceptable during the respective period of time. This may also be by way of increasing the FEC to source ratio by increasing FEC bitrate and decreasing the source bitrate in order to maintain the total current bitrate, as indicated at 346, in response to a feedback report indicating packet loss fluctuated or was otherwise unacceptable. In either case, the increase in the relative amount FEC packets in the stream may better equip the recipient device to handle packet loss, while also providing feedback to the sender device that may allow it determine whether the use of the available bandwidth in the network can be more efficiently utilized.

Figure 4:
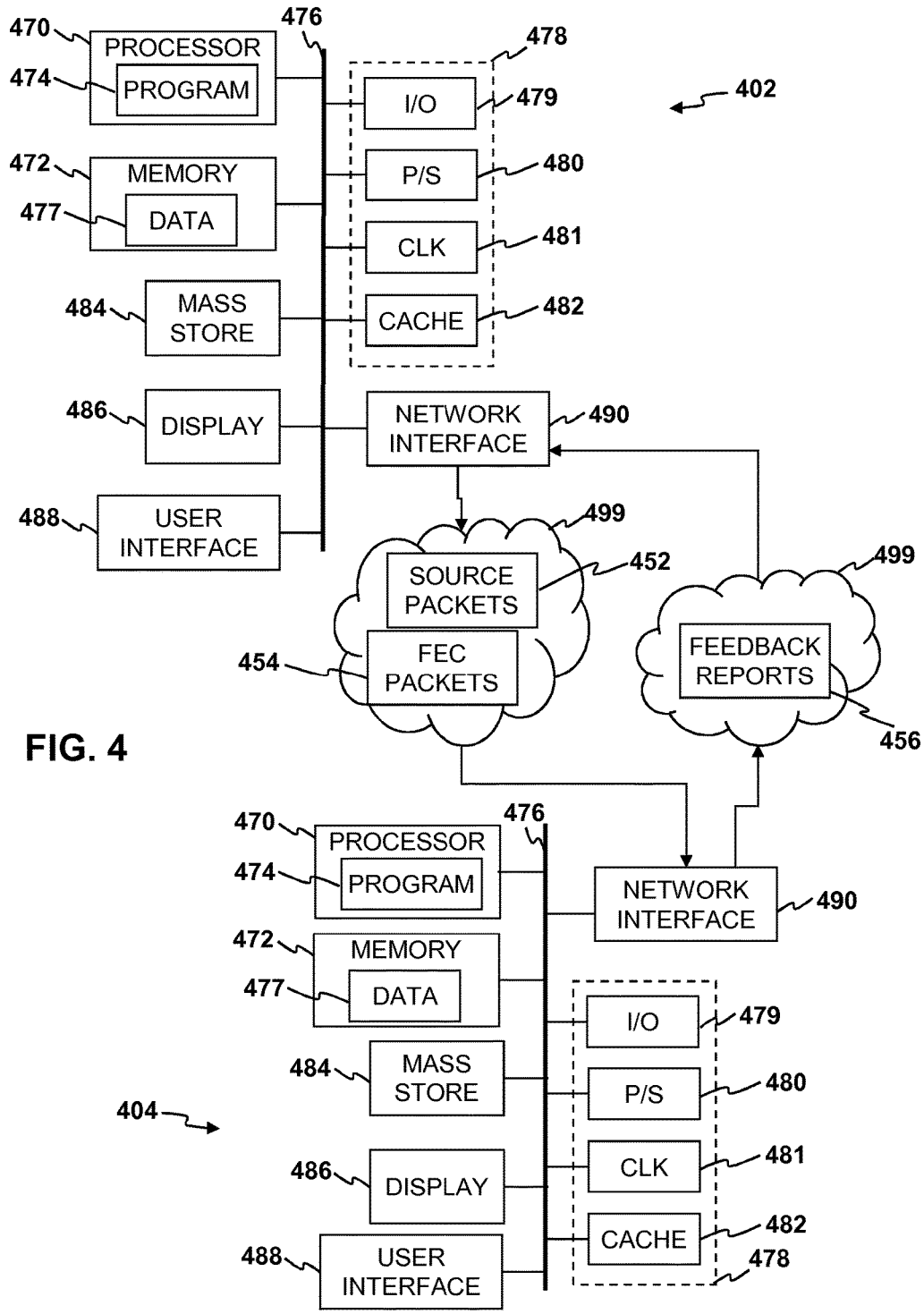
FIG. 4 is a block diagram of an example system in accordance with certain aspects of the present disclosure.

Certain implementations of the present disclosure include systems configured to implement congestion control and/or data transport methods according to certain aspects of the present disclosure, as shown in FIG. 4. FIG. 4 depicts a distributed computing system that includes at least one sender computing system 402 and at least one recipient computing system 404, and the computing systems 402 and 404 are configured to transfer data over a network in accordance with certain aspects of the present disclosure. In certain implementations, the sender computing system 402 may have one or more aspects in common with one or more of the senders of FIGS. 1-3. In certain implementations, the recipient computing system 404 may have one or more aspects in common with one or more of the recipients of FIGS. 1-3. Either or both of the sender system 402 and recipient system 404 may be configured with suitable software and/or hardware to implement various aspects of the methods described herein. Either or both of the sender system 402 and recipient system 404 may be a server, an embedded system, mobile phone, personal computer, laptop computer, tablet computer, portable game device, workstation, game console, wearable device such as a smart watch, and the like.

In accordance with certain implementations, the sender system 402 may be a cloud computing server, and the recipient device 404 may be a cloud computing client of the server 402, and the sender 402 may be configured to provide a data stream to the client device over a network 499 using an unreliable protocol. By way of example, and not by way of limitation, the sender 402 may be a server that is configured to provide a real-time data stream, such as a real-time audio stream, a real-time video stream, or a real-time audio/video stream to the at least one client device 404 over a network 499, such as the internet. The sender system 402 may be configured to send data to the recipient system in the form of source packets 452, containing the fundamental user data being delivered to the recipient system 404, and FEC packets 454, which contain redundancies of the source data contained in the source packets. The sender system 402 may send these FEC packets concurrently with the source packets to the recipient device 404 in accordance with various aspects of the present disclosure. The recipient system 404 may be configured to accumulate these data packets and periodically send feedback reports 456 back to the sender system 402 over the network 499. The sender system 402 may be configured to adjust the rate at which the data packets 452, 454 are sent in response to these feedback reports 456 in accordance with various aspects described herein.

Either of the systems 402 and 404 (i.e., sender system 402, recipient system 404, or both) may include one or more processor units 470, which may be configured according to well-known architectures, such as, e.g., single-core, dual-core, quad-core, multi-core, processor-coprocessor, cell processor, and the like. Either of the systems 402 and 404 may also include one or more memory units 472 (e.g., RAM, DRAM, ROM, and the like). The processor unit 470 may execute one or more programs 474, which may be stored in the memory 472, and the processor 470 may be operatively coupled to the memory 472, e.g., by accessing the memory via a data bus 476. The memory unit 472 may include data 477, and the processor unit 470 may utilize the data 477 in implementing the program 474. The data 477 for either of the systems 402 and 404 may include, e.g., source data transmitted from the sender system 402 to the recipient system 404, and feedback information transmitted from the recipient 404 to the sender 402 according to various aspects of the present disclosure. The program 474 may include instructions that, when executed by a processor, perform one or more operations associated with a celebrity video game session, such as, e.g., a method having one or more features in common with the methods of FIGS. 2 and/or 3. For example, the program 474 of the sender system 402 may include instructions that, when executed by the processor 470, cause the sender system to send data to the at least one recipient device 404 and/or control congestion in response to feedback received from the recipient device 404, in accordance with aspects of the sender side of the method depicted in FIG. 2 and/or the rate adjustment technique depicted in FIG. 3. The program 474 of the recipient system 404 may include instructions that, when executed by the processor 470, cause the recipient system to accumulate data packets, determine packet loss, and/or send feedback information to the sender 402 in accordance with aspects of the recipient side of the method depicted in FIG. 2.

Either of the systems 402 and 404 may also include well-known support circuits 478, such as input/output (I/O) circuits 479, power supplies (P/S) 480, a clock (CLK) 481, and cache 482, which may communicate with other components of the system, e.g., via the bus 476. Either of the systems 402 and 404 may optionally include a mass storage device 484 such as a disk drive, CD-ROM drive, tape drive, flash memory, or the like, and the mass storage device 484 may store programs and/or data. Either of the systems 402 and 404 may also optionally include a display unit 486. The display unit 486 may be in the form of a cathode ray tube (CRT), flat panel screen, touch screen, or other device that displays text, numerals, graphical symbols, or other visual objects. Either of the systems 402 and 404 may also include a user interface 488 to facilitate interaction between the system 402/404 and a user. The user interface 488 may include a keyboard, mouse, light pen, game control pad, touch interface, or other device. The user interface may also include an audio I/O device, such as a speaker and/or microphone.

A user may interact either of the computer systems through the user interface 488. By way of example, the sender may 402 may be a cloud gaming server, and the recipient system 404 may be a cloud gaming client, and a video game user may interact with a video game executed by the server 402 and streamed to the client 404 through the user interface 488. The rate at which data is transmitted from the server to the client may be optimized in accordance with aspects of the present disclosure to enhance the experience for the user and maintain the quality of a signal received at the client side. Portions of the user interface 488 may include a graphical user interface (GUI) that can be displayed on the display unit 486 in order to facilitate user interaction with the system 402/404. The system 402/404 may include a network interface 490, configured to enable the use of Wi-Fi, an Ethernet port, or other communication methods. The network interface 490 may incorporate suitable hardware, software, firmware or some combination thereof to facilitate communication via a telecommunications network, and may support data transport using an unreliable protocol in accordance with certain aspects of the present disclosure. The network interface 490 may be configured to implement wired or wireless communication over local area networks and wide area networks such as the Internet. Either of the systems 402 and 404 may send and receive data and/or requests for files via one or more data packets 499 over a network.

The above components may be implemented in hardware, software, firmware, or some combination thereof.

While the above is a complete description of the various illustrative implementations of the present disclosure, it is possible to use various alternatives, modifications and equivalents.

Therefore, the scope of the present invention should not be construed to be limited by the above description but should, instead, be determined with reference to the appended claims, along with their full scope of equivalents. Any feature described herein, whether preferred or not, may be combined with any other feature described herein, whether preferred or not. In the claims that follow, the indefinite article "a", or "an" refers to a quantity of one or more of the item following the article, except where expressly stated otherwise. The appended claims are not to be interpreted as including means-or-step-plus-function limitations, unless such a limitation is explicitly recited in a given claim using the phrase "means for" or "step for."

What is claimed is:

1. A method comprising, with a sender computing system:
   sending, via an unreliable protocol, a stream of data packets to one or more recipient devices over a network, the stream of data packets including source packets and forward error correction (FEC) packets;
   during said sending, determining a predetermined amount of data packets that will be sent during respective periods of time corresponding to regular streaming periods for periodic feedback reports;
   during said sending, receiving one or more feedback reports from the one or more recipient devices, each said periodic feedback report characterizing packet loss during one of said respective periods of time;
   normalizing the packet loss in at least one of the feedback reports to the predetermined amount of data packets when a number of data packets sent by the sender computing system during the respective period of time is less than the predetermined amount; and
   during said sending, adjusting a rate at which said data packets are sent in the stream in response to at least one of said feedback reports.

2. The method of claim 1,
   wherein the unreliable protocol is User Datagram Protocol (UDP).

3. The method of claim 1, further comprising:
   with said sender computing system, stamping each said data packet with a sequence number.

4. The method of claim 1, further comprising:
   with said sender computing system, stamping each said data packet with a sequence number,
   wherein said at least one of the one or more recipient devices characterizes the packet loss in each said feedback report by accumulating the data packets during the respective period of time, and by determining a number of the data packets actually received and a number of the data packets expected to be received from the sequence numbers of the data packets received by the recipient device during the respective period of time.

5. The method of claim 1, further comprising:
with said sender computing system, stamping each said data packet with sequence number;
with at least one of said one or more recipient devices, characterizing the packet loss in each said feedback report by accumulating the data packets during the respective period of time, and by determining a number of the data packets actually received and a number of the data packets expected to be received from the sequence numbers of the data packets received by the recipient device during the respective period of time.

6. The method of claim 1, wherein said adjusting the rate further comprises:
increasing a ratio of the FEC rate to the source rate while maintaining a total rate at which the data packets are sent in response to a particular one of the feedback reports which characterizes the packet loss as outside of an acceptable level.

7. The method of claim 1,
wherein said data packets include audio packets and video packets,
wherein said increasing a FEC rate at which the FEC packets are sent includes increasing both a FEC audio rate at which the FEC audio packets are sent and a FEC video rate at which the FEC video packets are sent,
wherein said increasing both the FEC audio rate and the FEC video rate includes increasing the FEC audio rate by a greater degree than the FEC video rate.

8. The method of claim 1,
wherein said data packets include audio packets and video packets,
wherein said increasing a FEC rate at which the FEC packets are sent includes increasing both a FEC audio rate at which the FEC audio packets are sent and a FEC video rate at which the FEC video packets are sent,
wherein said increasing both the FEC audio rate and the FEC video rate includes increasing the FEC audio rate by two to ten times more than the FEC video rate increase.

9. The method of claim 1,
wherein the one or more feedback reports are a plurality of periodic feedback reports having a pre-defined time interval between generation of each of the feedback reports.

10. The method of claim 1,
wherein the one or more feedback reports are a plurality of periodic feedback reports having a pre-defined time interval between generation of each of the feedback reports,
wherein the time interval is between 100 milliseconds and 1 second.

11. The method of claim 1,
wherein said one or more recipient devices is a plurality of recipient devices.

12. The method of claim 1,
wherein the unreliable protocol is connectionless.

13. The method of claim 1,
wherein the particular one of the feedback reports which indicates the packet loss as within the acceptable level indicates the packet loss as steady relative to a prior one of the feedback reports.

14. The method of claim 1, wherein said adjusting the rate comprises increasing a FEC rate at which the FEC packets are sent while maintaining a source rate at which the source packets are sent in response to a particular one of the feedback reports which characterizes the packet loss as within an acceptable level.

15. A sender computing system comprising:
at least one processor unit;
at least one memory unit coupled to the at least one processor unit;
wherein the at least one processor unit and the at least one memory unit are configured to perform a method, the method comprising:
sending, via an unreliable protocol, a stream of data packets to one or more recipient devices over a network, the stream of data packets including source packets and forward error correction (FEC) packets;
during said sending, determining a predetermined amount of data packets that will be sent during respective periods of time corresponding to regular streaming periods for periodic feedback reports;
during said sending, receiving one or more feedback reports from the one or more recipient devices, each said periodic feedback report characterizing packet loss during one of said respective periods of time;
normalizing the packet loss in at least one of the feedback reports to the predetermined amount of data packets when a number of data packets sent by the sender computing system during the respective period of time is less than the predetermined amount; and
during said sending, adjusting a rate at which said data packets are sent in the stream in response to at least one of said feedback reports,
wherein said adjusting the rate comprises increasing a FEC rate at which the FEC packets are sent while maintaining a source rate at which the source packets are sent in response to a particular one of the feedback reports which characterizes the packet loss as within an acceptable level.

16. The computing system of claim 15, further comprising:
computer readable instructions embodied the at least one memory unit, wherein the instructions are executable by the at least one processor unit to cause the computing system to perform the method.

17. The computing system of claim 15,
wherein the unreliable protocol is UDP.

18. The computing system of claim 15, the method further comprising:
stamping each said data packet with sequence number.

19. The computing system of claim 15, the method further comprising:
stamping each said data packet with sequence number,
wherein said one or more recipient devices characterizes the packet loss in each said feedback report by accumulating the data packets during the respective period of time, and by determining a number of the data packets actually received and a number of the data packets expected to be received from the sequence numbers of the data packets received by the recipient device during the respective period of time.

20. The computing system of claim 15, wherein said adjusting the rate further comprises:
increasing a ratio of the FEC rate to the source rate while maintaining a total rate at which the data packets are sent in response to a particular one of the feedback reports which characterizes the packet loss as outside of an acceptable level.

21. The computing system of claim 15,
wherein said data packets include audio packets and video packets,
wherein said increasing a FEC rate at which the FEC packets are sent includes increasing both a FEC audio rate at which the FEC audio packets are sent and a FEC video rate at which the FEC video packets are sent,
wherein said increasing both the FEC audio rate and the FEC video rate includes increasing the FEC audio rate by a greater degree than the FEC video rate.

22. The computing system of claim 15,
wherein said data packets include audio packets and video packets,
wherein said increasing a FEC rate at which the FEC packets are sent includes increasing both a FEC audio rate at which the FEC audio packets are sent and a FEC video rate at which the FEC video packets are sent,
wherein said increasing both the FEC audio rate and the FEC video rate includes increasing the FEC audio rate by two to ten times more than the FEC video rate increase.

23. The computing system of claim 15,
wherein the one or more feedback reports are a plurality of periodic feedback reports having a pre-defined time interval between generation of each of the feedback reports.

24. The computing system of claim 15,
wherein the one or more feedback reports are a plurality of periodic feedback reports having a pre-defined time interval between generation of each of the feedback reports,
wherein the time interval is between 100 milliseconds and 1 second.

25. The computing system of claim 15,
wherein the one or more recipient devices is a plurality of recipient devices.

26. The computing system of claim 15,
wherein the unreliable protocol is connectionless.

27. The computing system of claim 15,
wherein the particular one of the feedback reports which indicates the packet loss as within the acceptable level indicates the packet loss as steady relative to a prior one of the feedback reports.

28. The computing system of claim 15, wherein said adjusting the rate comprises increasing a FEC rate at which the FEC packets are sent while maintaining a source rate at which the source packets are sent in response to a particular one of the feedback reports which characterizes the packet loss as within an acceptable level.

29. A non-transitory computer readable medium having computer readable instructions embodied therein, the computer readable instructions being configured to implement a method when executed, the method comprising:
sending, via an unreliable protocol, a stream of data packets to one or more recipient devices over a network, the stream of data packets including source packets and forward error correction (FEC) packets;
during said sending, determining a predetermined amount of data packets that will be sent during respective periods of time corresponding to regular streaming periods for periodic feedback reports;
during said sending, receiving one or more feedback reports from the one or more recipient devices, each said periodic feedback report characterizing packet loss during one of said respective periods of time;
during said sending, normalizing the packet loss in at least one of the feedback reports to the predetermined amount of the data packets when a number of data packets sent during the respective period of time is less than the predetermined amount; and
during said sending, adjusting a rate at which said data packets are sent in the stream in response to at least one of said feedback reports.

30. The non-transitory computer readable medium of claim 29, wherein said adjusting the rate comprises increasing a FEC rate at which the FEC packets are sent while maintaining a source rate at which the source packets are sent in response to a particular one of the feedback reports which characterizes the packet loss as within an acceptable level.

* * * * *